Aug. 10, 1965  J. PICKLES  3,199,363
MANUAL VENT WING ACTUATOR
Filed May 6, 1963  2 Sheets-Sheet 2
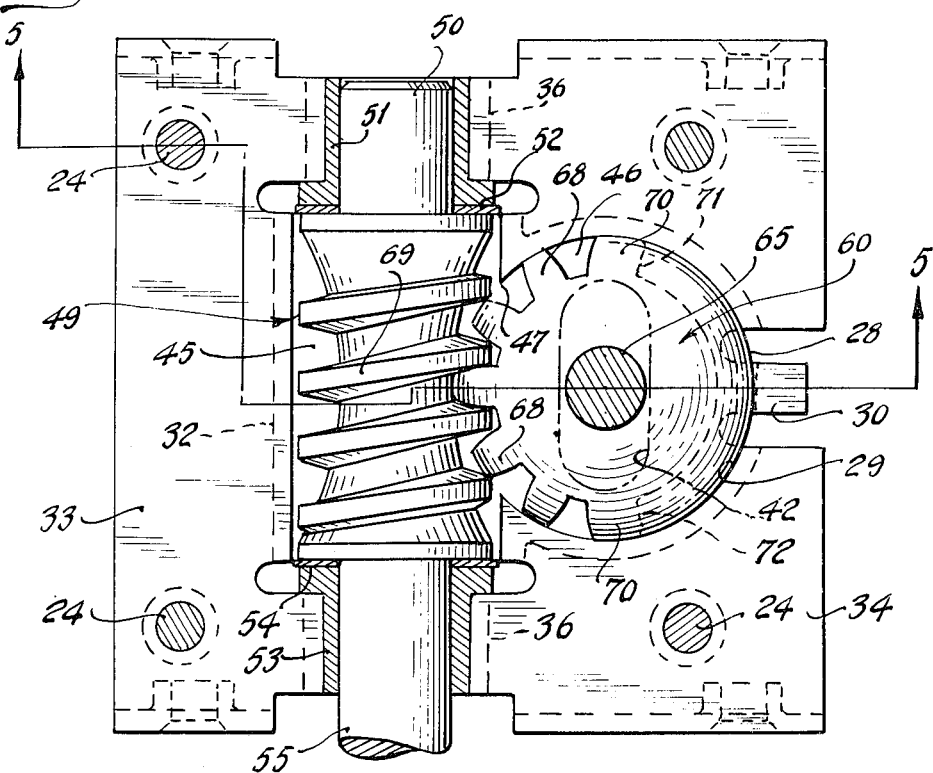
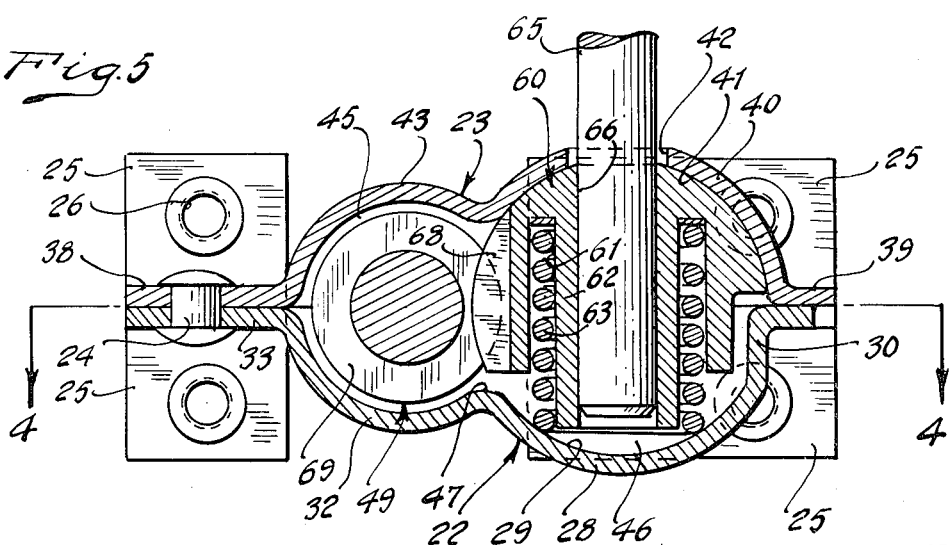
INVENTOR.
JOSEPH PICKLES
BY *Whittemore, Hulbert & Belknap*
ATTORNEYS

United States Patent Office 3,199,363
Patented Aug. 10, 1965

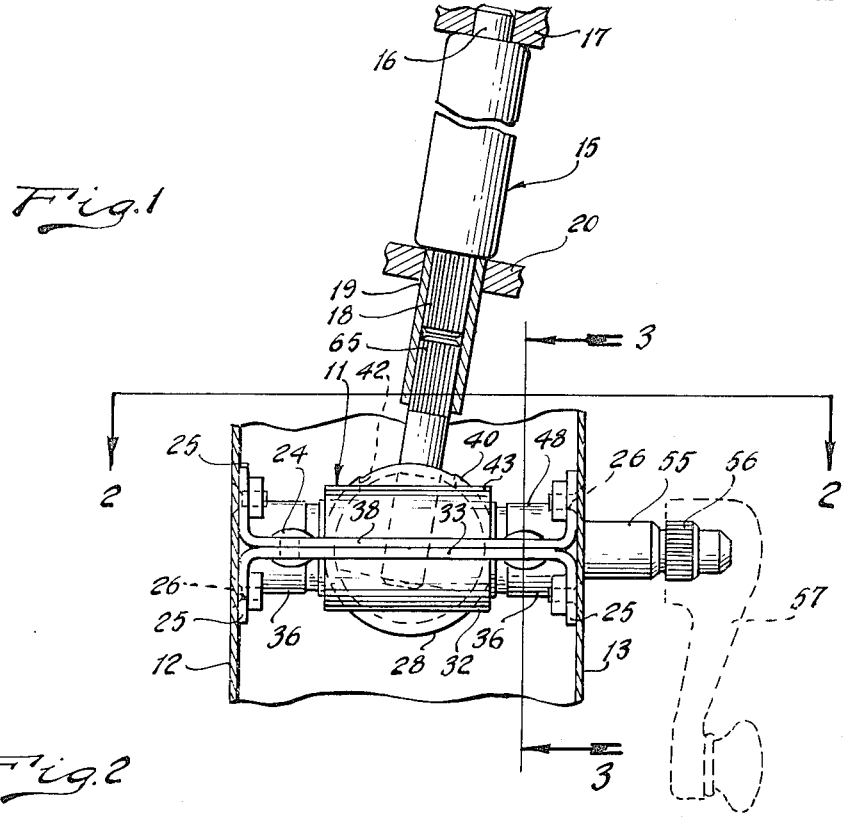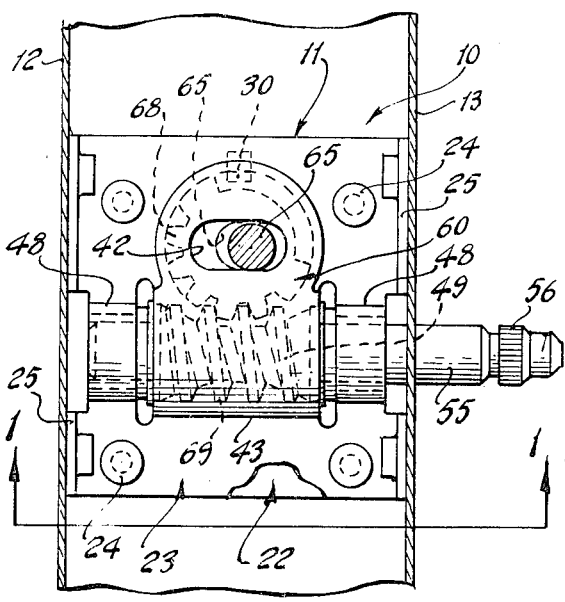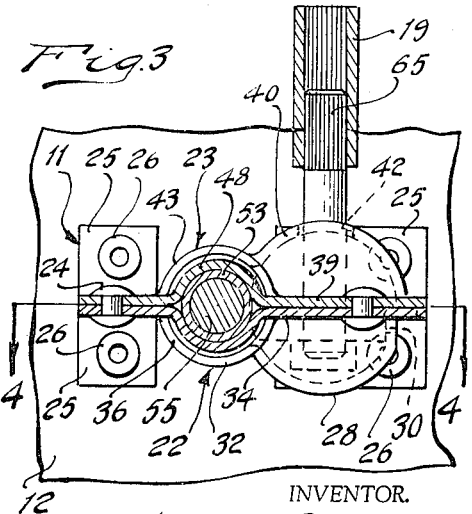

3,199,363
MANUAL VENT WING ACTUATOR
Joseph Pickles, Dearborn, Mich., assignor to Ferro Manufacturing Corporation, a corporation of Michigan
Filed May 6, 1963, Ser. No. 278,136
11 Claims. (Cl. 74—425)

The present invention relates to an improved manual vent wing actuator. More particularly, the invention relates to a manual actuator for the adjustment of the ventilator wing for an automobile door opening, usually the front door, and the improvements are such as to enable a shaft of the actuator connected to the vent wing to be disposed at a desired angle in relation to the manual crank shaft of the actuator, as dictated by the angularity of the window opening relative to the vertical, while still enabling the crank to rotate in a vertical plane on the inside of the door.

More specifically, the invention contemplates the provision of a hand crank actuator including improved gearing of the worm and worm gear type enabling a substantial angular displacement between the axes of the worm and worm gear to permit a vent operating shaft connected axially to the worm gear to be disposed at the desired angle relative to the vertical.

In accordance with this object, the invention contemplates a toothed worm gear of generally spheroidal character, housed for rotation within a generally spheroidal cavity of a sheet metal housing or casing mounted internally of the door. The actuator has a throated worm mounted for rotation within another, generally cylindrical part of the housing, in meshing engagement with teeth of the worm gear. The shaft of the worm, as thus mounted in the housing, projects inwardly of the inner panel of the door, where it is engaged by a manual operating crank; and an operating shaft carried by the worm gear is drivingly connected by a suitable adapter to the shaft of the window vent wing.

Thus, as permitted by the mount of the spheroidal worm gear in the spheroidal part of the housing, the operating shaft may be disposed at any desired angle to the vertical, leaving the manual crank operating shaft horizontal for operation of the crank in a vertical plane. The operating shaft extends upwardly through an elongated slot in the housing, enabling its selective adjustment as desired; and a relatively generous backlash at the worm gear teeth and worm helix permits this adjustment, which involves a matter of about plus or minus 8°.

In further specific accordance with the invention, the worm gear is segmental in nature, being provided with only a limited number of teeth sufficient to permit the needed limited adjustment of the vent wing; and the worm gear has stops for coaction with a part of the housing structure to limit the vent adjusting movement in either angular direction.

The foregoing as well as other objects will become more apparent as this description proceeds, especially when considered in connection with the accompanying drawings illustrating the invention, wherein:

FIG. 1 is a fragmentary view, partially broken away, in section along line 1—1 of FIG. 2 and in a vertical plane transversely of the thickness of an automobile door panel within which the actuator housing and its gearing are mounted, driving connections from a hand crank (dotted line) and to the vent wing shaft being shown;

FIG. 2 is a fragmentary view in horizontal section along line 2—2 of FIG. 1, different adjustable positions of the vent wing operating shaft of the actuator being shown in solid and dot-dash line;

FIG. 3 is a fragmentary view in vertical section along line 3—3 of FIG. 1;

FIG. 4 is a fragmentary view in enlarged scale, and in horizontal section along line 4—4 of FIGS. 3 and 5, more clearly illustrating internal structural details of the actuator's housing and gearing parts; and FIG. 5 is a view in vertical section on line 5—5 of FIG. 4.

Referring first to FIGS. 1, 2 and 3, the manual actuator of the invention is generally designated by the reference numeral 10. It comprises a sheet metal housing structure 11 adapted to be rigidly mounted between the outer and inner sheet metal panels 12, 13, respectively, of a conventional automobile front door. The reference numeral 15 designates the shaft of a conventional front door ventilating or vent wing (not shown), which shafting is journaled or piloted at 16 in a top portion 17 of the window frame, being also provided with a reduced diameter, splined lower extension 18. This driving extension is fixedly telescoped in a driving adapter sleeve 19, which is journaled in a lower portion 20 of the door frame at its window opening.

The casing or housing structure 11 is, as best illustrated in FIGS. 4 and 5, constituted by a pair of generally similar and matingly engaged lower and upper sheet metal stampings 22, 23, respectively, which are rigidly secured in mating, face-to-face engagement with one another by four rivets 24. Each plate is provided at each of its ends with a pair of 90° offset ears or flanged tabs 25 which, as indicated in FIG. 1, are punched and apertured to threadedly receive screws 26 to support the housing structure on the outer and inner door panels 12, 13. This affords a very rigid and rugged mount for the actuator 10 internally of the door.

The lower housing stamping 22 is formed to provide a quasi-spheroidal, socket-like worm gear encasing portion 28 affording an internal surface 29 of the same contour; and, as best shown in FIGS. 4 and 5, the housing portion 22 is at one side thereof slotted and inwardly offset at 30 to provide a stop element for a purpose to be described. Directly adjacent the opposite side of the quasi-spheroidal housing formation 28, the latter is formed to provide a generally cylindrical worm encasing portion 32, from which extends a border flange 33 on which one pair of the mounting ears 25 of part 22 are carried. The other pair of ears 25 are integral with a relatively wide, flat web formation 34 of part 22, from which the stop 30 is struck. The worm encasing formation 32 is shaped at its opposite ends to provide semicylindrical, axially aligned journal formations 36 (see also FIGS. 1 and 3). As indicated above, the upper part or half 23 of housing structure 22 is generally similar to the lower stamping part 22. Thus, it carries a flat flange 38 at one side thereof upon which its attaching tabs, ears or flanges 25 are formed; and at its opposite side it has a further flat flange 39 from which its remaining ears 25 are formed. Intermediate these flanges, part 23 is stamped to provide an upper worm gear encasing portion 40 affording a quasi-spheroidal internal bearing seat or surface 41; and this portion 40 is provided with a horizontal opening 42 elongated in the inside-outside direction between the door panels 12, 13. Directly adjoining the formation 40, a generally cylindrical worm encasing portion 43 is provided on housing part 23.

As secured together in mated relation by the rivets 24, parts 22 afford a worm encasing space 45 (FIG. 4) of cylindrical character and a worm gear bearing or journaling space 46, these spaces being in side-by-side communication with one another at an opening 47 through which the gearing of actuator 10 is in meshing engagement. Like the lower housing part 22, the upper part 23 is formed to provide reduced diameter, generally cylindrical bearing formations 48 (FIGS. 1, 2 and 3), which coact with the corresponding formations 36 of the lower part in receiving certain worm journaling means, to be described.

The reference numeral 49 designates a throated spool-like worm having an integral end extension 50 journaled in a bushing 51 carried within one pair of the mating housing formations 36, 48. An anti-friction end thrust washer 52 may be interposed between bushing 51 and the adjacent end of worm 49. Similarly, a bushing 53 and thrust washer 54 surround an integral spindle or shaft 55 on the opposite end of worm 49, bushing 53 being carried in coacting bearing formations 36, 48; and spindle 55 is provided with a knurled formation 56 upon which a hand crank 57 (dotted line in FIG. 1) has a force fit. In this manner, the crank 57 is mounted for rotation in a vertical plane paralleling the inner door panel 13.

The reference numeral 60 designates a generally spheroidal worm gear having mating engagement with the internal surface 41 of the quasi-spheroidal formation 40 of upper housing part 23. Gear 46 is provided with an annular recess 61 surrounding an integral sleeve portion 62 on an upright axis of the gear; and the recess receives a coiled compression spring 63 bottoming on the quasi-spheroidal surface 29 of the formation 28 of lower housing portion 22. Thus the gear is urged upwardly for bearing engagement with the bearing surface 41.

A stem or shaft 65 is fixedly and drivingly mounted in the bore 66 of gear 60; and this stem 65 is drivingly connected at its top (FIG. 1), as by a knurled connection, in the lower end of the driving adapter 19, which also drivingly receives the extension 18 of the shafting 15 of the vent wing.

Gear 60 is formed with teeth 68 about a portion of its external surface, these teeth extending laterally through the opening 47 of housing structure 11 (FIG. 5), for meshing engagement with the driving helix 69 of worm 49, it being noted that a single throated worm and worm gear set is the result. Only sufficient teeth 68 are formed on gear 60 to enable the desired, relatively limited pivoting of the operating stem or shaft 65, and the endmost tooth formations, specially designated 70 in FIG. 4, are formed to provide abutments 71, 72, respectively engageable with the offset stop formation 30 on lower housing part 22, thus to limit the pivoting swing of worm gear 60.

It is seen that, as the driving stem 65 extends through the elongated slot 42 in upper housing part 23, a desired inside to outside adjustment of its angular position is possible, as from the solid line position to the dot-dash line position of FIG. 2. This swing must also be permitted in the zone of meshing engagement of the worm helix 69 with the teeth 68 of worm gear 60, and for this purpose, sufficient backlash is built into the mesh to permit the desired limited tilt without binding.

It is seen that the invention thus affords an improved actuator whose housing structure 11 may be built into the space between door panels 12, 13 so as to dispose the crank-receiving spindle 55 horizontally, for operation of crank 57 in an upright plane paralleling panel 13; yet the output actuating shaft or stem 65 may be swung as desired (but in a limited degree, of course) in the inside-outside direction to enable a perfect alignment with the vent wing structure of the door. The parts are inexpensively produced and assembled, and foolproof, and require no replacement or maintenance, once installed.

The drawings and the foregoing specification constitute a description of the improved manual vent wing actuator in such full, clear, concise and exact terms as to enable any person skilled in the art to practice the invention, the scope of which is indicated by the appended claims.

What I claim as my invention is:

1. A manual actuator of the type described for providing a drive connection between rotatable driving and driven elements in an adjustably acute angled relationship of the axes of said elements to one another, comprising a worm member having means to drivingly connect the same to one of said elements, a worm gear member meshing with said worm member and having means to drivingly connect the same to the other element, and a housing structure providing a space to receive and journal one of said members for a tilting adjustment of its axis in a plane in parallel, non-intersecting relation to the axis of the other, thus to enable the acute angled relationship of said axes of said elements.

2. A manual actuator of the type described for providing a drive connection between rotatable driving and driven elements in an adjustably acute angled relationship of the axes of said elements to one another, comprising a worm member having means to drivingly connect the same to one of said elements, a worm gear member meshing with said worm member and having means to drivingly connect the same to the other element, and a housing structure providing a space to receive and journal said gear member for a tilting adjustment of its axis in a plane in parallel, non-intersecting relation to the axis of the worm member, thus to enable the acute angled relationship of said axes of said elements.

3. A manual actuator of the type described for providing a drive connection between rotatable driving and driven elements in an adjustably acute angled relationship of the axes of said elements to one another, comprising a worm member having means to drivingly connect the same to one of said elements, a worm gear member of quasi-spheroidal outline meshing with said worm member and having means to drivingly connect the same to the other element, and a housing structure providing a space to receive and journal said gear member for a tilting adjustment of its axes in a plane in parallel, non-intersecting relation to the axis of the worm member, thus to enable the acuate angled relationship of said axes of said elements.

4. A manual actuator of the type described for providing a drive connection between rotatable driving and driven elements in an adjustably acute angled relationship of the axes of said elements to one another, comprising a worm member of throated spool-like cross section having means to drivingly connect the same to one of said elements, a worm gear member of quasi-spheroidal outline meshing with said worm member and having means to drivingly connect the same to the other element, and a housing structure providing a space to receive and journal said gear member for a tilting adjustment of its axis in a plane in parallel, non-intersecting relation to the axis of the worm member, thus to enable the acute angled relationship of said axes of said elements.

5. A manual actuator of the type described for providing a drive connection between rotatable driving and driven elements in an adjustably acute angled relationship of the axes of said elements to one another, comprising a worm member of throated spool-like cross section having means to drivingly connect the same to one of said elements, a worm gear member of quasi-spheroidal outline meshing with said worm member and having means to drivingly connect the same to the other element, and a housing structure providing a space to receive and journal said gear member for a tilting adjustment of its axis in a plane in parallel, non-intersecting relation to the axis of the worm member, thus to enable the acute angled relationship of said axes of said elements, said housing structure providing a quasi-spheroidal face with which said worm gear member has socketed engagement in its said adjustment.

6. A manual actuator of the type described for providing a drive connection between rotatable driving and driven elements in an adjustably acute angled relationship of the axes of said elements to one another, comprising a worm member of throated spool-like cross section having means to drivingly connect the same to one of said elements, a worm gear member of quasi-spheroidal outline meshing with said worm member and having means to drivingly connect the same to the other element, and a housing structure providing a space to receive and journal said gear member for a tilting adjustment of its axis in a plane in parallel, non-intersecting relation to the axis of the worm member, thus to enable the acute angled relationship of said axes of said elements, said housing structure including a pair of plates in face-to-face engagement and providing a quasi-spheroidal face with which said worm gear member has socketed engagement in its said adjustment.

7. A manual actuator of the type described for providing a drive connection between rotatable driving and driven elements in an adjustably acute angled relationship of the axes of said elements to one another, comprising a worm member of throated spool-like cross section having means to drivingly connect the same to one of said elements, a worm gear member of quasi-spheroidal outline meshing with said worm member and having means to drivingly connect the same to the other element, and a housing structure providing a space to receive and journal said gear member for a tilting adjustment of its axis in a plane in parallel, non-intersecting relation to the axis of the worm member, thus to enable the acute angled relationship of said axes of said elements, said housing structure including a pair of plates in face-to-face engagement and providing a quasi-spheroidal surface with which said worm gear member has socketed engagement in its said adjustment, said structure including a portion partially encasing said worm member in meshing engagement of the latter with said worm gear member.

8. A manual actuator of the type described for providing a drive connection between rotatable driving and driven elements in an adjustably acute angled relationship of the axes of said elements to one another, comprising a worm member having means to drivingly connect the same to one of said elements, a worm gear member in mesh with said worm member and having means to drivingly connect the same to the other element, and means journaling said members to provide for an adjustment of the axis of one thereof in a plane in parallel, non-intersecting relation to the axis of the other thereof, thus to enable said acute angled relationship of said axes of said elements.

9. A manual actuator of the type described for providing a drive connection between rotatable driving and driven elements in an adjustably acute angled relationship of the axes of said elements to one another, comprising a worm member having means to drivingly connect the same to one of said elements, a worm gear member of quasi-spheroidal outline in mesh with said worm member and having means to drivingly connect the same to the other element, and means journaling said members to provide for an adjustment of the axis of one thereof in a plane in parallel, non-intersecting relation to the axis of the other thereof, thus to enable said acute angled relationship of said axes of said element, said journaling means providing a quasi-spheroidal surface with which said worm gear member has socketed engagement in its said adjustment.

10. A manual actuator of the type described for providing a drive connection between rotatable driving and driven elements in an adjustably acute angled relationship of the axes of said elements to one another, comprising a worm member of throated spool-like cross section having means to drivingly connect the same to one of said elements, a worm gear member of quasi-spheroidal outline in mesh with said worm member and having means to drivingly connect the same to the other element, and means journaling said members to provide for an adjustment of the axis of one thereof in a plane in parallel, non-intersecting relation to the axis of the other thereof, thus to enable said acute angled relationship of said axes of said elements, said journaling means providing a quasi-spheroidal surface with which said worm gear member has socketed engagement in its said adjustment.

11. A manual actuator of the type described for providing a drive connection between rotatable driving and driven elements in an adjustably acute angled relationship of the axes of said elements to one another, comprising a worm member of throated spool-like cross section having means to drivingly connect the same to one of said elements, a worm gear member of quasi-spheroidal outline in mesh with said worm member and having means to drivingly connect the same to the other element, and housing means journaling said members to provide for an adjustment of the axis of one thereof in a plane in parallel, non-intersecting relation to the axis of the other thereof, thus to enable said acute angled relationship of said axes of said elements, said journaling means providing a quasi-spheroidal surface with which said worm gear member has socketed engagement in its said adjustment, said housing means being constituted by a pair of generally sheet metal plates fixedly secured in face-to-face engagement and having formations to journal said members.

References Cited by the Examiner

UNITED STATES PATENTS 2,223,997   12/40   Lorentzen _____ 74—425

DON A. WAITE, *Primary Examiner.*